United States Patent
Young

(10) Patent No.: US 11,765,542 B2
(45) Date of Patent: *Sep. 19, 2023

(54) HYBRID VISION SYSTEM FOR CROP LAND NAVIGATION

(71) Applicant: Climate LLC, Saint Louis, MO (US)

(72) Inventor: Mark Young, San Francisco, CA (US)

(73) Assignee: CLIMATE LLC, Saint Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,011

(22) Filed: Jan. 31, 2022

(65) Prior Publication Data

US 2022/0262112 A1   Aug. 18, 2022

Related U.S. Application Data

(63) Continuation of application No. 16/593,151, filed on Oct. 4, 2019, now Pat. No. 11,238,283.

(51) Int. Cl.
*H04W 4/021* (2018.01)
*G06N 20/00* (2019.01)
(Continued)

(52) U.S. Cl.
CPC .......... *H04W 4/021* (2013.01); *G05D 1/0246* (2013.01); *G06F 18/2413* (2023.01);
(Continued)

(58) Field of Classification Search
CPC ......... H04W 4/021; H04W 4/38; H04W 4/40; G05D 1/0246; G05D 2201/0201;
(Continued)

(56) References Cited

U.S. PATENT DOCUMENTS 9,076,105 B2 * 7/2015 Anderson ................ G06N 5/04
9,098,529 B1   8/2015 Seth
(Continued)

FOREIGN PATENT DOCUMENTS

CA    2748079 A1 *  2/2012 ............... G06N 5/04
CA    3094523 A1 *  9/2019 ........... A01B 79/005
(Continued)

OTHER PUBLICATIONS

U.S. Appl. No. 16/593,151, filed Oct. 4, 2019.
(Continued)

*Primary Examiner* — Mahendra R Patel
(74) *Attorney, Agent, or Firm* — Harness, Dickey & Pierce, P.L.C.

(57) ABSTRACT

In an embodiment, autonomous vehicles with global positioning systems (GPS) are used for field inspection to reduce fuel and labor costs and improve reliability with increased consistency in field crop inspection. A vehicle may be programmed to traverse a field while using sensors to detect objects and operating in a first image capture mode, for example, capturing low-resolution images of objects in the field, typically crops. Under program control, machine vision techniques are used with the low-resolution images to recognize crops, non-crop plant material or undefined objects. Under program control, location data is used to correlate recognized objects with digitally stored field maps to resolve whether a particular object is in a location at which crop planting is expected or not expected. Under program control, depending on whether an object in a low-resolution digital image is recognized as a crop, and whether the object is in an expected geo-location for crops, the vehicle may cease traversing temporarily and switch to a second image capture mode, for example, capturing a high-resolution image of the object, for use in disease
(Continued)

analysis or classification, weed analysis or classification, alert notifications or other messages, or other processing. In this manner, a field may be rapidly traversed and imaged using coarse-level, rapid techniques that require lower processing resources, storage or memory, while automatically switching to execute special processing only when necessary to resolve unexpected objects or to perform operations such as disease classification that benefit from high-resolution images and more intensive use of processing resources, storage or memory.

25 Claims, 9 Drawing Sheets

(51) Int. Cl.
    *G05D 1/02*    (2020.01)
    *G06V 20/10*   (2022.01)
    *G06V 20/56*   (2022.01)
    *G06V 30/24*   (2022.01)
    *G06F 18/2413* (2023.01)
    *G06V 10/70*   (2022.01)

(52) U.S. Cl.
    CPC ............ *G06N 20/00* (2019.01); *G06V 10/87* (2022.01); *G06V 20/10* (2022.01); *G06V 20/188* (2022.01); *G06V 20/56* (2022.01); *G06V 30/2504* (2022.01); *G05D 2201/0201* (2013.01)

(58) Field of Classification Search
    CPC ... G06F 18/2413; G06F 18/285; G06N 20/00; G06V 10/87; G06V 20/10; G06V 20/188; G06V 20/56; G06V 30/2504; A01B 69/001; A01B 79/005
    USPC ........................................................ 382/110
    See application file for complete search history.

(56) References Cited

U.S. PATENT DOCUMENTS

| | | | | |
|---|---|---|---|---|
| 9,489,576 | B2* | 11/2016 | Johnson | G06V 10/25 |
| 9,655,356 | B1 | 5/2017 | Lytle, Jr. | |
| 10,037,689 | B2 | 7/2018 | Taylor | |
| 10,139,279 | B2* | 11/2018 | Pluvinage | G01J 3/2823 |
| 10,255,670 | B1 | 4/2019 | Wu | |
| 10,627,386 | B2* | 4/2020 | Saez | A01B 79/005 |
| 10,755,129 | B2* | 8/2020 | Chen | G06Q 50/02 |
| 11,061,155 | B2 | 7/2021 | Puntous | |
| 11,238,283 | B2 | 2/2022 | Young | |
| 2005/0150160 | A1* | 7/2005 | Norgaard | A01G 2/00 47/58.1 SE |
| 2011/0047867 | A1* | 3/2011 | Holland | G01N 21/31 356/51 |
| 2011/0081475 | A1* | 4/2011 | Huber | A23L 29/219 426/637 |
| 2014/0288850 | A1 | 9/2014 | Avigdor | |
| 2015/0278966 | A1 | 10/2015 | Johnson | |
| 2016/0066505 | A1 | 3/2016 | Bakke | |
| 2016/0247079 | A1* | 8/2016 | Mewes | G06N 5/048 |
| 2017/0173262 | A1* | 6/2017 | Veltz | G16H 20/17 |
| 2017/0223947 | A1 | 8/2017 | Gall | |
| 2018/0204321 | A1* | 7/2018 | Fryshman | A01M 1/2094 |
| 2018/0259496 | A1* | 9/2018 | McPeek | G01N 33/025 |
| 2019/0050948 | A1* | 2/2019 | Perry | A01B 79/005 |
| 2019/0150357 | A1* | 5/2019 | Wu | H04N 7/188 |
| 2019/0228224 | A1* | 7/2019 | Guo | G06N 20/20 |
| 2019/0228225 | A1 | 7/2019 | Guo | |
| 2019/0259108 | A1* | 8/2019 | Bongartz | G06Q 10/0639 |
| 2020/0019777 | A1* | 1/2020 | Gurzoni, Jr. | G06V 10/803 |
| 2020/0113166 | A1 | 4/2020 | Warren, Jr. | |
| 2020/0294620 | A1* | 9/2020 | Bauer | G06V 20/188 |
| 2020/0327326 | A1* | 10/2020 | Gavish | G06V 10/764 |

FOREIGN PATENT DOCUMENTS

| | | | | |
|---|---|---|---|---|
| DE | 10002880 | | 6/2001 | |
| EP | 3467702 | A1* | 4/2019 | ......... A01B 79/005 |
| WO | WO-2018042445 | A1* | 3/2018 | ......... A01B 79/005 |
| WO | WO-2018071727 | A1* | 4/2018 | ......... A01B 79/005 |
| WO | WO2018/136875 | | 7/2018 | |
| WO | WO-2019162192 | A1* | 8/2019 | ......... A01B 79/005 |
| WO | WO-2019237200 | A1* | 12/2019 | ......... A01B 79/005 |
| WO | WO-2020012259 | A1* | 1/2020 | ......... A01B 79/005 |

OTHER PUBLICATIONS

U.S. Appl. No. 16/593,151: Notice of Allowance dated Sep. 16, 2021. The instant application is a continuation of U.S. Appl. No. 16/593,151.

PCT/US2020/052107: International Search Report and Written opinion dated Jan. 7, 2021. PCT/US2020/052107 has the same priority claim as the instant application.

* cited by examiner

Fig. 2
(a)
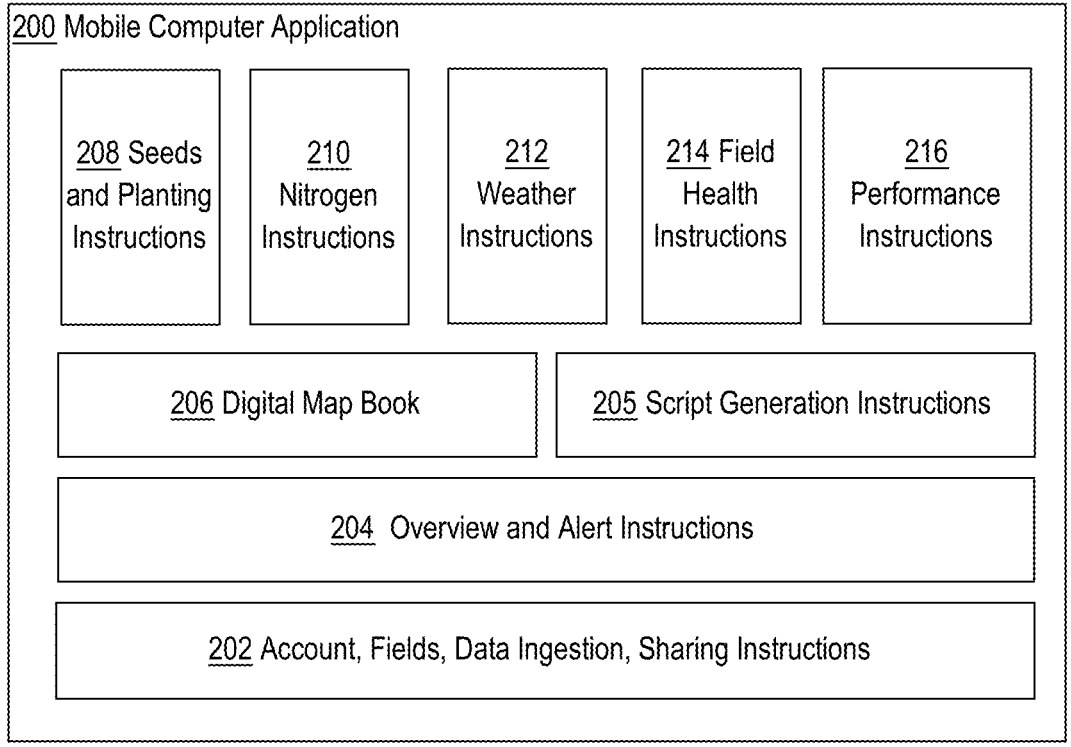
(b)
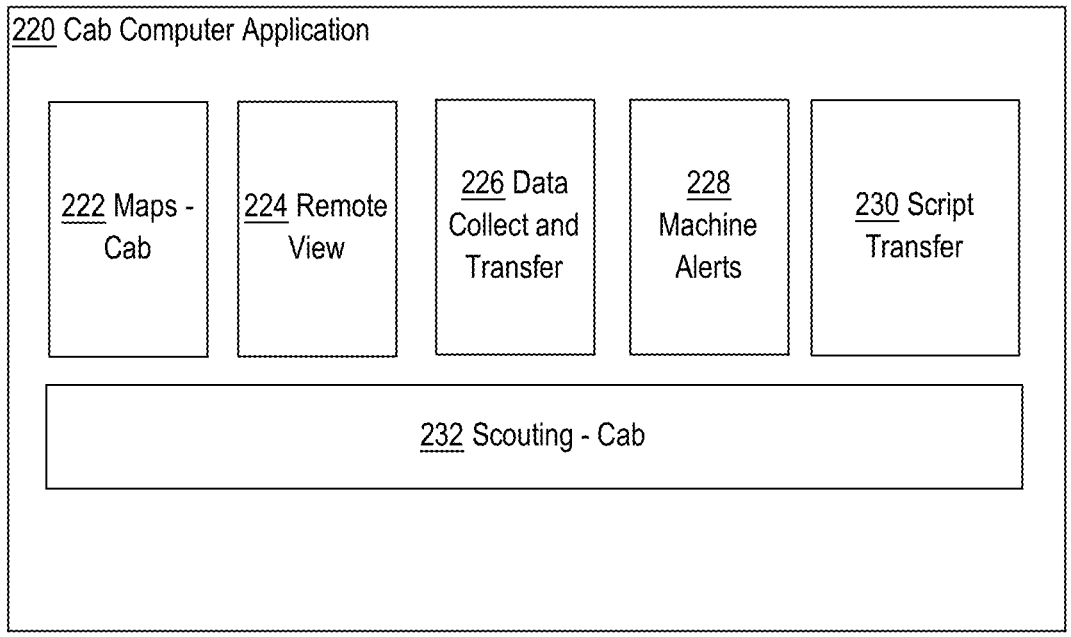

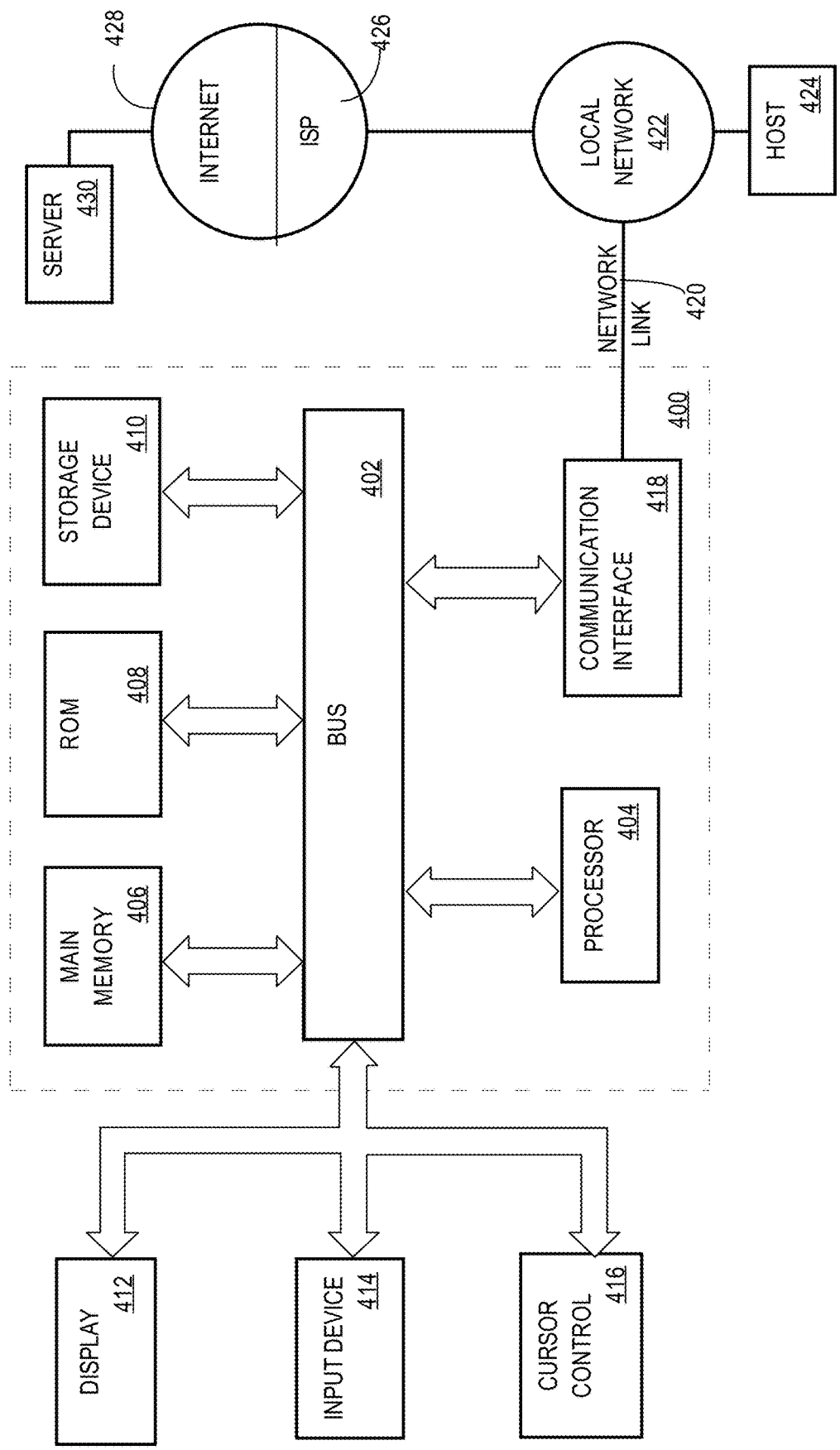

FIG. 5

Data Manager

Nitrogen | Planting | Practices | Soil

Fall applied (2 Fields)
Amount: 150 lbs N/ac
Applied: 1 x applications
Edit | Apply Fall manure (0 Fields)
Amount: 200 lbs N/ac
Applied: 3 x applications
Edit | Apply N Program 1 (0 Fields)
Amount: 150 lbs N/ac
Applied: 2 x applications
Edit | Apply Spring applied (4 Fields)
Amount: 150 lbs N/ac
Applied: 2 x applications
Edit | Apply Test program
Amount: 250
Applied: 2 x
Edit Select All Aug | Sept | Oct | Nov | Dec | Jan | Feb | Mar | Apr | May | Jun | Jul | Aug | Sept
                              2015

Ames, IA 1 — Corn | 100 | Boone, IA — 150 (N) — 150 (N)(P) — 103 Surplus

Austin, MN 1 — Corn | 100 | Fredricks, MN — 150 (N)(P) — 111 Surplus

Boone, IN 1 — Corn | 100 | Boone, IA — 130 (N)(P) — 20 Surplus

Champaign 1 — Corn | 100 | Champaign, IL — 80 (N)(P) — 58 Surplus

E Nebraska 1 — Corn | 100 | Burt, NE — 100 (N)(P) — 50 (N) — 107 Surplus

FIG. 6

Data Manager

| Nitrogen | Planting | Practices | Soil |

Planting 1(4 Fields)
Crop Corn Product
Plant Date: 2016-04-12
ILU 112 | Pop: 34000
[Edit] [Apply]

Planting 2(0 Fields)
Crop Corn Product
Plant Date: 2016-04-15
ILU 83 | Pop: 34000
[Edit] [Apply]

Planting 3(0 Fields)
Crop Corn Product
Plant Date: 2016-04-13
ILU 83 | Pop: 34000
[Edit] [Apply]

Planting 4(1 Fields)
Crop Corn Product
Plant Date: 2016-04-13
ILU 112 | Pop: 34000
[Edit] [Apply]

[+ Add New Planting Plan]

| | | CROP | PLANTED ACRES | PRODUCT | RELATIVE MATURITY | TARGET YIELD | POPULATION(AVG) | PLA |
|---|---|---|---|---|---|---|---|---|
| ☐ | Select All | | | | | | | |
| ☐ | Ames, IA 1<br>Corn \| 100 \| Boone, IA | Corn | — | DMC82-M | 112 | 160 | 34000 | Apr |
| ☐ | Austin, MN 1<br>Corn \| 100 \| Fredricks, MN | Corn | — | DMC82-M | 114 | 160 | 36000 | Apr |
| ☐ | Boone, IN 1<br>Corn \| 100 \| Boone, IA | Corn | — | DMC82-M | 112 | 150 | 34000 | Apr |
| ☐ | Champaign 1<br>Corn \| 100 \| Champaign, IL | Corn | — | — | 112 | 200 | 34000 | Apr |
| ☐ | E Nebraska 1<br>Corn \| 100 \| Burt, NE | Corn | — | — | 112 | 160 | 34000 | Apr |

Fig. 7

710 Using agricultural data record processing instructions that are executed by autonomous mobile equipment having a digital camera while traversing an agricultural field, receiving low-resolution digital images of a specific plant to be classified with a corresponding agricultural product type to be determined and planted at one or more field geolocations of the agricultural field represented by field space geolocation data 720 Using agricultural data record processing instructions, receiving specific field space geolocation of the specific field space geolocation of the autonomous mobile equipment in the agricultural field 730 Using image processing instructions, in response to receiving the digital image data and the specific field space geolocation data, attempting to determine a plant type match by matching the specific agricultural product type to one or more pre-classified product types 740 Using the image processing instructions, in response to receiving the digital image data and the specific field space geo-location data, attempting to determine a plant location match by matching the specific field space geo-location to one or more pre-classified plant geolocations 750 Using agricultural classification instructions, in response to determining a plant type match and failing to determine a plant location match, obtain high-resolution image and transmit a notification indicating no classification of the specific agricultural product 760 Using agricultural classification instructions, in response to failing to determine plant type match and determining a plant location match, skipping classification of the specific agricultural product 770 Using agricultural classification instructions, in response to determining a plant type match and a plant location match, transmitting a disease analysis notification on of the specific agricultural product 780 Using agricultural classification instructions, in response to determining a plant type match and failing to determine a plant location match, obtain high-resolution image and transmit a weed analysis notification of the specific agricultural product with optional alert

HYBRID VISION SYSTEM FOR CROP LAND NAVIGATION

CROSS REFERENCE TO RELATED APPLICATIONS

This application is a continuation of U.S. application Ser. No. 16/593,151, filed Oct. 4, 2019, the entire contents of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2018-2019 The Climate Corporation/Climate LLC.

FIELD OF THE DISCLOSURE

One technical field of present disclosure is machine vision as applied to recognition of plants and weeds in agriculture. Another technical field is robotics. Still another field is computer-supported management of crop and field treatment practices in agriculture.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Rapid growth of agriculture technology improved crop yield, crop production and growth efficiency, yield predictability, and field and climate-based crop planting approaches. However, one shortcoming of technology-based agriculture planning and maintenance is costly, inefficient and environmentally undesirable methods. For example, weed remediation in fields during the growth season usually requires traversal of the field with manually operated tractors combined with manual physical removal of weeds or spraying with herbicides. Even environmentally friendly measures using computer vision that enable autonomous vehicle navigation and object recognition to detect plant from weed are unable to distinguish different objects. Weeds, for example, may be nearly indistinguishable from common plants depending on the growth stage of each.

Agricultural fields may be large and climate-sensitive with varying crop types and crop yields, both of which can vary based on field location and climate, among a host of other factors. An agricultural field may be divided into regions or spaces with different crop plant types. Planting maps identify field space locations with differing plant types. For example, a field plot map may describe a field by regions of varying crop plant type. Field inspection may be used for enhancing crop yield by addressing events that may cause crop infestation causing crop disease. Undesirable non-crop and/or unplanted objects like weeds are regular visitors to fields and adversely affect the health and growth of field crops. Field inspections typically are time inefficient and labor-intensive when conducted by manned agricultural equipment subject to fuel and labor costs.

In a common agricultural application, agriculture equipment might traverse a planted crop field for crop extraction, inspection, or other crop-related functions. It is vital for the agricultural equipment to accurately, reliably and speedily detect where a green plant is, for instance. Image recognition techniques can use training image sets to enable recognition of different plant and leaf structures, but since plants are always growing and changing, in-season, this approach can be difficult to achieve across the continuum of growth from plant emergence to plant maturity. Common navigation and image recognition techniques rely on a specific range of contrast values for proper image processing detection. However, during initial phases of the season such as during seeding, these techniques are largely ineffective because digital images of bare soil lack adequate contrast with foliage, which may be in the middle of rows of fields, to enable reliable detection. Subsequently into crop season, when plants are much larger in size and leafier in shape at maturity, image contrast in digital images again becomes an issue.

Accordingly, the common approaches to both navigation and image recognition prove difficult in practice in the crop field, produce inaccurate detection, are inefficient, costly, and unreliable.

The foregoing issues gives rise to the need for improved crop field navigation and detection systems.

SUMMARY OF THE DISCLOSURE

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 4 is a block diagram that illustrates a computer system upon which an embodiment of the invention may be implemented.

FIG. 5 illustrates a functional overview of a data blending subsystem according to an embodiment.

FIG. 6 illustrates an example process flow for blending point data and areal averages in block diagram according to an embodiment.

FIG. 7 illustrates how to use a fitted model to generate a prediction of an environmental variable at a given time and location in block diagram form according to an embodiment.

DETAILED DESCRIPTION

Figure 1:
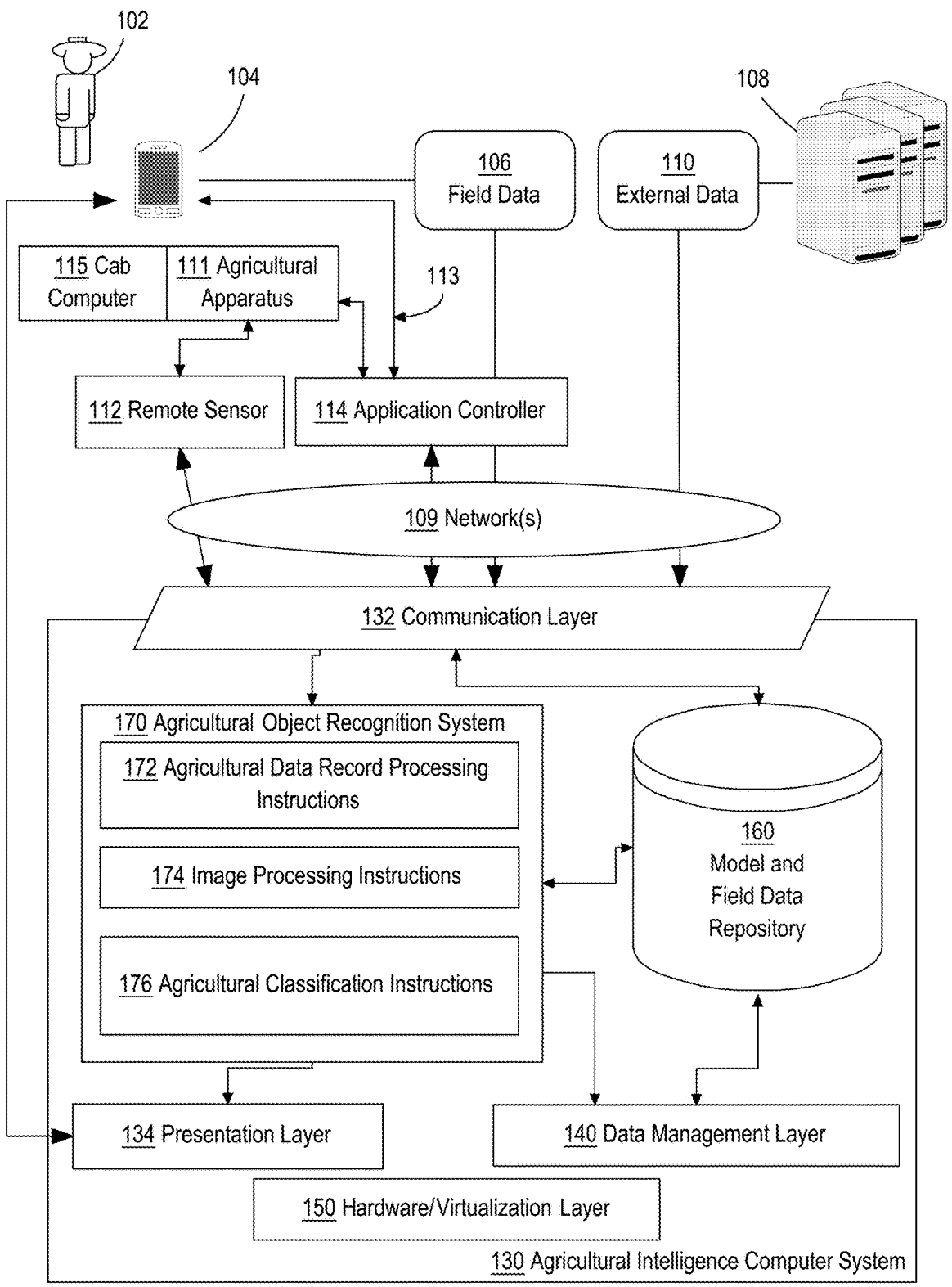
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure.

It will be apparent, however, that embodiments may be practiced without these specific details. In other instances, well-known structures and devices are shown in block diagram form in order to avoid unnecessarily obscuring the present disclosure. The description is provided according to the following outline:

1.0 General Overview
2.0 Example Agricultural Intelligence Computer System
   2.1 Structural Overview
   2.2 Application Program Overview
   2.3 Data Ingest to the Computer System
   2.4 Process Overview—Agronomic Model Training
   2.5 Implementation Example—Hardware Overview
3.0 Example Autonomous Agricultural Classification System
   3.1 Accurate Classification Detection
   3.2 Automated Mobile Agricultural Product Feature Classification
   3.3 Autonomous Mobile Agricultural Equipment
4.0 Other Aspects of Disclosure 1.0 General Overview In an embodiment, autonomous vehicles with global positioning systems (GPS) are used for field inspection to reduce fuel and labor costs and improve reliability with increased consistency in field crop inspection. A vehicle may be programmed to traverse a field while using sensors to detect objects and operating in a first image capture mode, for example, capturing low-resolution images of objects in the field, typically crops. Under program control, machine vision techniques are used with the low-resolution images to recognize crops, non-crop plant material or undefined objects. Under program control, location data is used to correlate recognized objects with digitally stored field maps to resolve whether a particular object is in a location at which crop planting is expected or not expected. Under program control, depending on whether an object in a low-resolution digital image is recognized as a crop, and whether the object is in an expected geo-location for crops, the vehicle may cease traversing temporarily and switch to a second image capture mode, for example, capturing a high-resolution image of the object, for use in disease analysis or classification, weed analysis or classification, alert notifications or other messages, or other processing. In this manner, a field may be rapidly traversed and imaged using coarse-level, rapid techniques that require lower processing resources, storage or memory, while automatically switching to execute special processing only when necessary to resolve unexpected objects or to perform operations such as disease classification that benefit from high-resolution images and more intensive use of processing resources, storage or memory.

In an embodiment, an autonomous mobile vehicle is equipped with sensing and vision capability and is programmed to selectively switch between two forms of automatic hybrid product recognition based on machine vision. In an embodiment, a first mode of hybrid recognition uses machine vision techniques to recognize plant material while the autonomous vehicle traverses an agricultural field. The first mode provides coarse image recognition based on rapid travel through a field while scanning objects for recognition, in combination with a simplified algorithm for recognition. In an embodiment, a second mode of hybrid recognition is more computationally intense, is directed to accurate discrimination between field crops and weeds and is executed while the vehicle is stationary. The first mode is cost-effective, fast, and efficient and in some cases could be considered "brute force" recognition to rapidly exclude non-plant objects, while the second mode usually is slower but more accurate.

Both processes may be viewed as environmentally friendly as they use autonomous mobile vehicles that may be battery-powered. Furthermore, the use of high-quality image processing devices, such as one or more high resolution cameras and sensors, provides the benefit of enhanced sensing and image capture capabilities as compared to prior techniques, enabling deep product classification analysis. In any of the foregoing embodiments, the autonomous vehicle may be implemented as a special-purpose robot having a global positioning system (GPS) receiver to generate real-time geo-location data, camera devices and guidance sensors to provide fast and efficient classification results or slower but high-quality results.

Embodiments may be programmed to execute weed detection for the purpose of weed eradication, and/or to execute disease detection or pest detection for the purpose of applying fungicides, pest control products or other products to address different disease conditions.

In any of the foregoing embodiments, the autonomous vehicle may download and store in memory on the vehicle, or access in online storage via wireless networking, a digitally stored field map or planting map that represents field boundaries and the locations of seed placement or crop placement. The combination of sense-intelligent autonomous vehicles or robots and field planting or crop maps offers a unified system for reliable and efficient navigation and agricultural product classification, inspection, and detection. GPS location, guidance data, machine vision information, and field plot map data can be used to project a field of view of the vehicle, in three-dimensional space, increasing classification reliability. Thus, augmented reality visualization techniques may be used to use data layers such as the field map to inform the objects in digital images that are captured in the field. For example, in some embodiments, the autonomous vehicle is programmed to determine whether an object that has been recognized as a plant is in a location in the field in which crops are expected or unexpected, based upon planting data or seeding data. Based upon field map data that comprises metadata indicating planted areas, the autonomous vehicle acts upon digitally stored data of an expected field plant location and unexpected field plant locations to implement plant classification at a coarse level. The autonomous vehicle may be programmed, in response to recognizing an image of a plant in an expected field geolocation, to determine that the object is a part of a crop. Similarly, the autonomous vehicle may be programmed, in response to recognizing an image of a plant in a non-expected field geolocation, to determine that the object is an undesirable product type, such as a weed.

By combining vision, sensing, and other data layers into a single hybrid system in the foregoing manner, objects can be accurately, rapidly, and efficiently recognized when the autonomous vehicle is navigating a crop field. When objects are recognized in an unexpected field location, then the autonomous vehicle may be programmed to use high resolution, enhanced imagery to assist with distinguishing crops from non-crop objects. For example, visual differences between undesirable agricultural products such as weeds may be distinguished from crop foliage using more computationally intensive techniques or by capturing multiple high-resolution images for analysis.

Additional data may be used in recognition and analysis operations. For example, plant growth patterns may be assessed using data specifying field weather and number of days since planting. The expected structure of foliage, the expected height of plants or other attributes may be predicted based on stored phenology data. In some embodiments, determining macro-level information like plant height can result in rapid scanning and identification of plants.

In an embodiment, a computer-implemented method comprises, using agricultural data record processing instructions that are executed by an autonomous mobile equipment having a digital camera while traversing an agricultural field, receiving digital image data representing images of one or more plants in an agricultural field, each plant having a corresponding agricultural product type represented by agricultural product type data, the digital image data including one or more images of a specific plant to be classified, the specific plant having an associated specific agricultural product type to be determined and planted at one or more field geolocations of the agricultural field, a planted field geo-location represented by field space geolocation data; using the agricultural data record processing instructions, receiving specific field space geolocation data representing a specific field space geolocation of the autonomous mobile equipment in the agricultural field; using image processing instructions, in response to receiving the digital image data and the specific field space geolocation data, attempting to determine a plant type match by matching the specific agricultural product type to one or more pre-classified product types; using the image processing instructions, in response to receiving the digital image data and the specific field space geolocation data, attempting to determine a plant location match by matching the specific field space geolocation to one or more pre-classified plant geolocations; using agricultural classification instructions, in response to failing to determine a plant type match and failing to determine a plant location match, transmitting a no classification notification of the specific agricultural product; using agricultural classification instructions, in response to failing to determine plant type match and determining a plant location match, skipping classification of the specific agricultural product; using agricultural classification instructions, in response to determining a plant type match and a plant location match, transmitting a disease analysis notification on of the specific agricultural product; using agricultural classification instructions, in response to determining a plant type match and failing to determine a plant location match, transmitting a weed analysis notification of the specific agricultural product; causing displaying the notification on a graphical user interface of a user computer that is separate from the autonomous mobile equipment.

Other features and aspects of the disclosure will become apparent in the drawings, description, and claims.

2. Example Agricultural Intelligence Computer System

2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGR-ESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs. N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, image retrieval instructions 136 comprises a set of one or more pages of main memory, such as RAM, in the agricultural intelligence computer system 130 into which executable instructions have been loaded and which when executed cause the agricultural intelligence computer system to perform the functions or operations that are described herein with reference to those modules. For example, the image retrieval instructions 136 may comprise a set of pages in RAM that contain instructions which when executed cause performing obtaining data from an unmanned aircraft system (UAS)—carried imaging system 700 as further described herein, for further analysis.

Embodiments may be implemented using programmed processes with software in networked distributed computer systems such as virtual machine instances in cloud computing centers, or in autonomous vehicles with processors that are programmed as further described herein, or in a combination of autonomous vehicle software and other software executing in the cloud or a host computer that is separate from the autonomous vehicle. In one embodiment, the agricultural intelligence computer system 130 comprises an agricultural object recognition system 170 consisting of sets of executable instructions that when executed cause performing the functions or operations that are described herein. For example, the agricultural object recognition system 170 comprises agricultural data record processing instructions 172, image processing instructions 174, and agricultural classification instructions that when executed cause the computer system 130 to perform the functions or operations described herein with reference to those modules. In another embodiment, the agricultural object recognition system 170 may be mounted in, integrated into, installed in, or connected to an autonomous mobile equipment or a robot rather than within the computer system 130. In either embodiment, agricultural object recognition system 170 may comprise a set of pages in RAM that contain instructions which when executed cause performing the target identification functions that are described herein.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, the image retrieval instructions 136 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use. In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates:

a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In another embodiment, sensors 112 and controllers 114 may comprise weather devices for monitoring weather conditions of fields. For example, the apparatus disclosed in International Pat. Application No. PCT/US2016/029609 may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
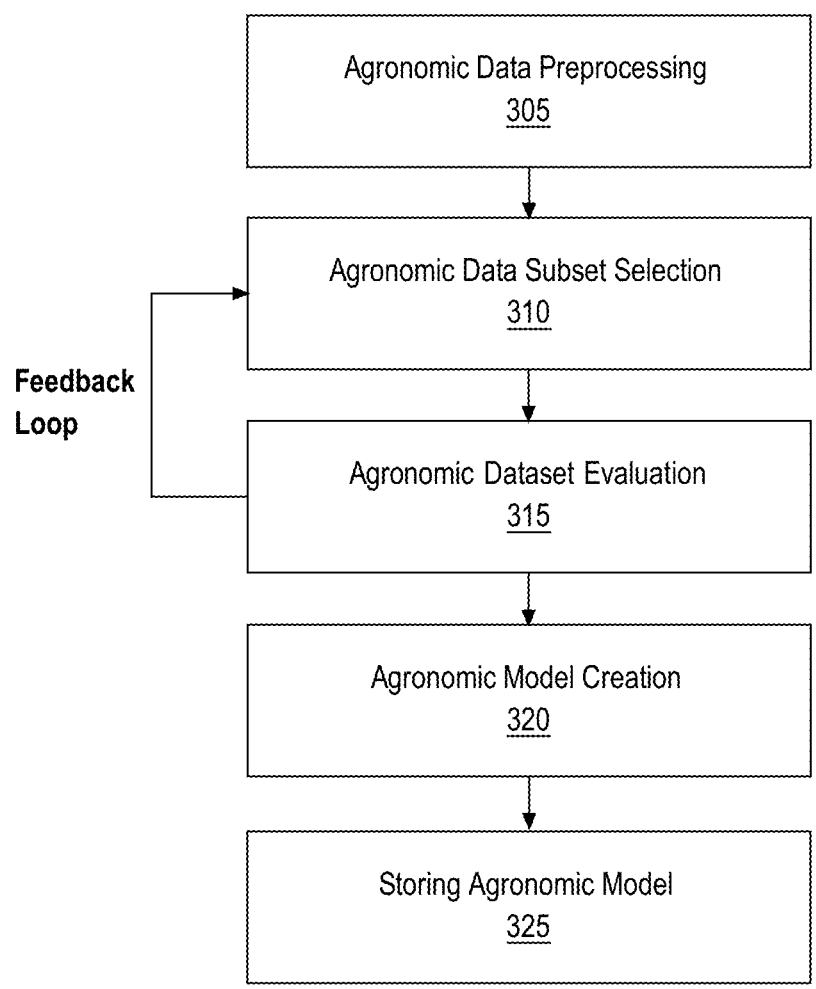
FIG. 3 illustrates a programmed process by which the agricultural intelligence computer system generates one or more preconfigured agronomic models using agronomic data provided by one or more external data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3.0 Example Autonomous Agricultural Classification System

3.1 Overview

Farm maintenance measures may involve routine at-season field inspections for plant health to detect undesirable and unplanted objects. Field inspection may be performed by detecting plant types based on comparison of real-time plant type classification prediction data, based on digital images of field plant and field geolocation measurements, and pre-classified plant types. The accuracy of field image data and field geolocation measurements affects reliable plant classification. While some parts of this disclosure discuss classification and detection for a single planting field, embodiments may be used with any number of fields.

In an embodiment, processing image data of crops in the field, receiving accurate field geolocation data, and having access to a digital field planting map can be used to project, in three-dimensional space, precise locations of plants in the field, thereby increasing the accuracy and reliability of agricultural product detection and classification. In an embodiment, a mobile autonomous agricultural equipment or robot comprises an onboard GPS receiver, one or more guidance sensors to detect objects by proximity, and one or more high resolution image capturing devices. Furthermore, in an embodiment, the equipment or robot stores, in digital memory, or obtains from separate digital data storage via a wireless networking interface, a field map having metadata specifying rows, crops or other features of the field. The apparatus is programmed to execute plant classification while traveling a crop field.

In an embodiment, features and locations of plants that are detected in a field are matched against known locations and features in the stored field map. Classification is determined in real time, based on the match outcome as the mobile autonomous equipment travels the crop field.

In one embodiment, the one or more high resolution image capturing devices may comprise one or more digital cameras, for example, a high-resolution camera and a low-resolution camera for selectively capturing high-resolution and low-resolution digital images, respectively. As the autonomous agricultural equipment traverses the field, the low-resolution camera may be used to detect non-crop or unplanted field objects at a coarse level of accuracy. In response to detection of an object, the autonomous agricultural equipment is programmed to determine the object type; if no determination can be made due to poor quality of detection data, then the autonomous agricultural equipment may be programmed to use the high-resolution camera to capture additional digital images of the detected object. Then, the autonomous agricultural equipment is programmed to perform image processing on the detection data to determine one or more candidate classifications of the object.

In an embodiment, the approaches herein provide rapid, environmentally friendly and efficient plant type detection with reduced use of fuel or labor. Accurate detection data leads to reliable and precise plant type detection. Accurate plant type detection may assist a grower in improving field management. For example, seeds can be planted efficiently based on matching plant type with field weather and terrain. A plant type might grow better at a higher altitude of the field, accordingly, seeds of the plant type are best planted at higher field space geolocations. For efficiency, growers can use plant type information to manage removal of undesirable field objects that might adversely affect planted objects.

3.2 Automated Mobile Agricultural Product Feature Classification

FIG. 7 shows a process for automated mobile agricultural plant type classification. In an embodiment, a classification process 700 is performed using programmed instructions that are executed by a computer in an autonomous mobile vehicle or robot. In an embodiment, the process of FIG. 7 is performed to determine classification of plant type, or classification of other agricultural product types. In an embodiment, the process of FIG. 7 may be performed to determine or classify other plant features, such as plant color, plant height, plant size, plant growth or a combination thereof. In an embodiment, other classification processes may be executed; for example, classification of a plant type may lead to classification of a feature of the plant type. In an embodiment, plant analysis other than plant classification may be performed; for example, plant analysis may determine the sustainability of a particular plant type under different field climate conditions.

In an embodiment, at step 710, the process is programmed for receiving digital images of a specific field agricultural product to be classified or analyzed. In an embodiment, step 710 is performed by agricultural data record processing instructions 172 of FIG. 1 that are executed by an autonomous mobile equipment with one or more an onboard digital camera while traversing the agricultural field. In an embodiment, one or more low resolution and one or more high resolution cameras are employed at various stages of process 700. In an embodiment, one or more low resolution cameras are employed in step 710 to support coarse-level image recognition. In an embodiment, the agricultural product is a plant, but other embodiments may operate in connection with other items or products. In an embodiment, a specific field plant is classified based on a digitally stored field map or other field space geolocation data that specifies the locations of planting or seeding of one or more seeds or hybrids at one or more field geolocations. The field map or other field space geolocation data may be used to determine whether a particular field space or region of a field is expected to contain plants.

At step 720, a specific field space geolocation of the specific field space geolocation of the autonomous mobile vehicle in the agricultural field is received by the autonomous mobile equipment.

Next, at step 730, in response to receiving the digital image data and the specific field space geolocation data, a plant type determination is calculated by matching the specific agricultural product type to one or more pre-classified (agricultural) product types. At step 730, using image processing instructions (FIG. 1), in response to receiving the digital image data and the specific field space geolocation data, a plant location determination is attempted, by the autonomous mobile equipment, by matching the specific field space geolocation to one or more pre-classified (field) plant geolocations. In an embodiment, step 730 is performed by agricultural data record processing instructions 172 (FIG. 1), that are executed by an autonomous mobile equipment with one or more an onboard digital camera while traversing the agricultural field. In an embodiment, step 730 is performed by image processing instructions 174 (FIG. 1), that are executed by an autonomous mobile equipment with one or more an onboard digital camera while traversing the agricultural field.

At step 740, in response to determining a plant type match at step 730 and failing to determine a plant location match at step 720, the process is programmed to transmit a notification that no classification of the specific agricultural product resulted. In an embodiment, after transmitting the notification of no classification, process 700 is programmed to return to step 702. In another embodiment, no notification is transmitted, and the process returns and resumes from step 702.

At step 750, in response to failing to determine a plant type match at step 740 and determining a plant location match at step 730, the process 700 is programmed to obtain a high-resolution image and transmit a notification indicating no classification of the specific agricultural product. In an embodiment, the process is programmed to transmit a notification specifying that classification was skipped or not performed, and the process returns to step 702. In another embodiment, no notification is transmitted. Transmitting a high-resolution digital image of the object that the vehicle encountered can support further analysis of the object by the receiver of the notification, or using a remote host computer or cloud computing instance.

At step 760, in response to determining a plant type match at step 740 and a plant location match at step 730, a disease analysis notification on of the specific agricultural product is transmitted. Thus, step 760 is executed in response to both identifying a crop and determining that the crop is in an expected location in the field; with this combination, an embodiment may be programmed to execute more detailed analysis to determine whether plant foliage is consistent with disease or another condition In another embodiment, no disease analysis notification is transmitted and process 700 returns and resumes from step 702. Disease is an example of a product type candidate. In an embodiment, other product-related product type characterizations of product being classified may be implemented.

At step 770, in response to determining a plant type match at step 740 and failing to determine a plant location match at step 730, a weed analysis notification of the specific agricultural product is transmitted after which the process returns to step 702. Thus, step 770 is executed when the process has determined that a plant is recognized, but it is located in a place in which crops are not expected. Example locations may include between-row areas, row ends or equipment turnaround points, roads and so forth. In another embodiment, no weed analysis notification is transmitted and process 700 returns to and resumes from step 702.

Next, at step 780, in response to determining a plant type match and a plant location match, the process is programmed to obtain a high-resolution image of the object and transmit a weed analysis notification of the specific agricultural product with an optional alert. Transmitting a high-resolution digital image of the object that the vehicle encountered can support further analysis of the object by the receiver of the notification, or using a remote host computer or cloud computing instance. For example, a more resource-intensive weed analysis can be performed using the high-resolution image to determine whether a weed is present at the unexpected location and what kind of weed is present.

Based on the outcome of plant type and field geolocation matches of step 730 and step 740, respectively, the process 700 may be programmed to cause displaying a notification on a graphical user interface of a user computer that is separate from the autonomous mobile equipment. In an embodiment, the process 700 is programmed to cause displaying the notification on graphical user interface of field manager computer device 104 (FIG. 1).

Referring again to step 740, in an embodiment, step 740 is performed by using image processing instructions 174 (FIG. 1), that are executed by the autonomous mobile equipment with one or more an onboard digital camera while traversing the agricultural field. In an embodiment, steps 750 through 780 are performed by agricultural classification instructions 176 (FIG. 1), that are executed by an autonomous mobile equipment with one or more an onboard digital camera while traversing the agricultural field.

In an embodiment, an object of an agricultural field that is to be classified based on type may be matched against one or more digitally stored pre-classified agricultural products. Similarly, an object of an agricultural field that is to be classified by field location may be matched against one or more pre-classified agricultural field locations based on digitally stored field climate, object growth, field soil and other field characteristics. For example, a plant product to be classified by field location may be matched against one or more pre-classified agricultural products that grow well in the whole or part of a corresponding agricultural field. In an embodiment, plant type match may be based at least in part on digitally stored field climate data specifying a historic or current field climate of the agricultural field.

In an embodiment, a plant location match determination between the specific field space geolocation and one or more pre-classified agricultural products geolocations may be based on various conditions. In an example field plot map forms the basis of the determination, as earlier indicated. A plot map has a geolocation of one or more specific agricultural products of a corresponding. In an example, plant location match determination between a specific field space geolocation and one or more pre-classified agricultural product geolocations may be based on a digitally stored plot map of a corresponding agricultural field.

3.3 Autonomous Mobile Agricultural Equipment

Figure 8:
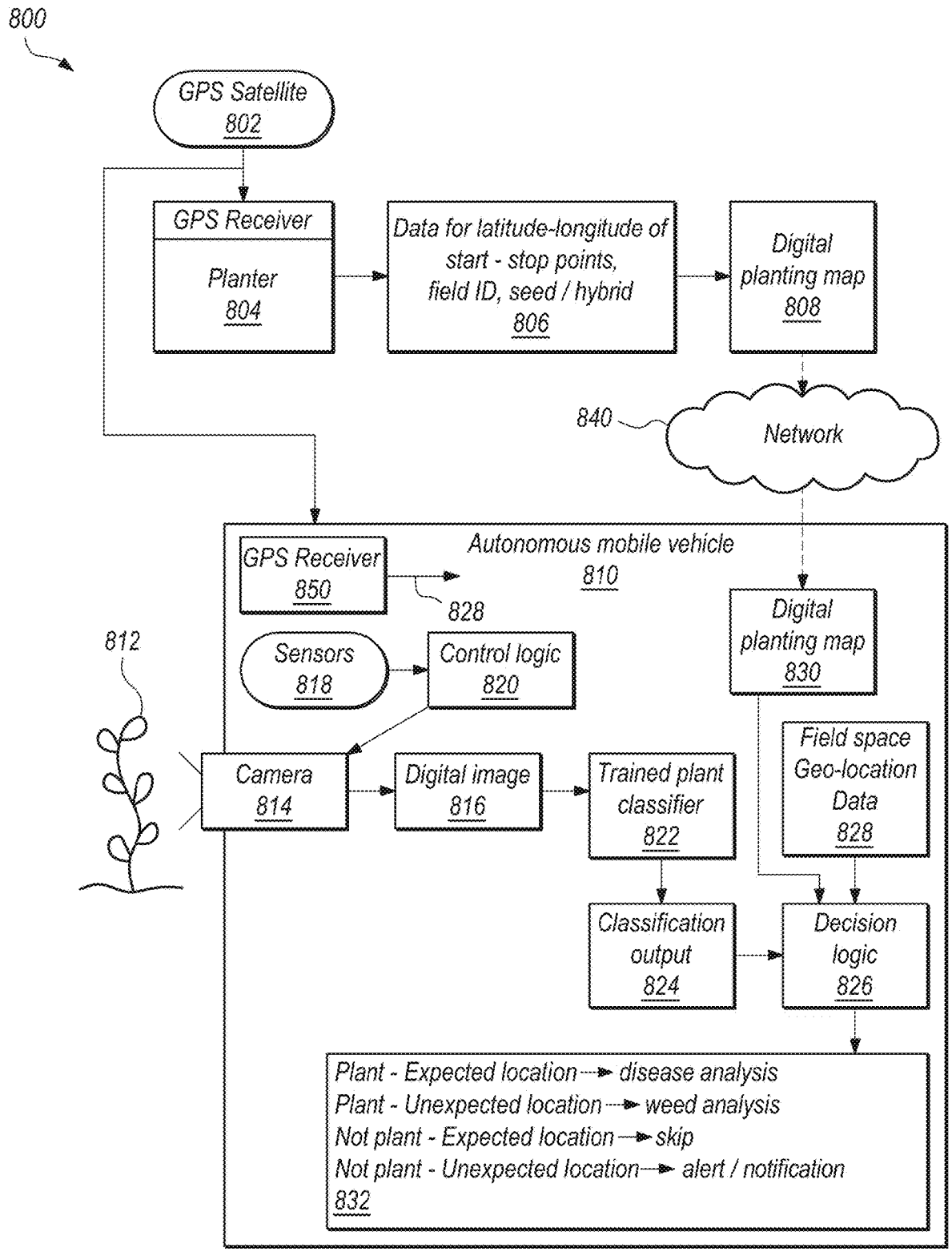
FIG. 8 depicts a block diagram of an automated mobile field plant classification system, in an embodiment.

FIG. 8 depicts a block diagram of an automated mobile field plant classification system, in an embodiment.

In an embodiment, an automated mobile field plant classification system 800 includes an agricultural seed planter 804 and an autonomous mobile vehicle 810 that are communicatively coupled through a network 840. In an embodiment, agricultural seed planter 810 generates a digital planting map 808 or field map, represented by digital planting map data, and transmits the digital planting map data to autonomous mobile vehicle 810. Autonomous mobile vehicle 810 receives the transmitted digital planting map data and based on the received digital planting map, attempts to match a field plant type and a field geolocation to pre-classified plant type and pre-classified field geolocation, respectively, to attempt to determine a classification of a plant type of an object detected by the mobile autonomous mobile vehicle 810 as it travels a field. In an embodiment, classification may be of unplanted and/or non-crop objects. An example of an unplanted object is weed 812 and examples of non-crop objects are a tire, tool or debris.

In an embodiment, the autonomous mobile vehicle 810 may comprise any autonomous mobile equipment that is functionally capable of executing the processes that are described herein for the autonomous mobile vehicle. In an embodiment, digital planting map is a GPS encoded planting map identifying locations, spaces or regions of a field and planted locations with fine resolution.

In an embodiment, network 840 broadly represents one or more wireless networks, internetworking elements such as routers or switches, gateways and hubs, and/or internetworks using WiFi, near-field radio, WiLAN, satellite or other communications technologies.

In an embodiment, global positioning system (GPS) satellite 802 generates GPS signals that are received by a GPS receiver of an agricultural seed planter 804 and transformed via GPS triangulation or other transformation algorithms into GPS location data that represents the geolocation of the seed planter within one or more planting fields. The term specific field GPS location data may represent the geolocation of a specific field.

In an embodiment, field geolocation data comprises latitude and longitude values, start-stop point values, field identification values, seed/hybrid type data, and other field location-related data. Start-stop point values represent geolocations in the field at which the planter starts to plant seeds and stops to plant seeds. In an embodiment, field geolocation data may be processed to generate a digital planting map describing attributes and geolocations of one or more fields, for example, field identification, field geolocation coordinates, field planted regions, spaces, or rows, and field planting type, and other field related information. For example, field identification data may be a numeric or character value that identifies a field, field planting type may distinguish seeds from hybrid plants that are planted at a corresponding field. In other embodiments, the planting map may be created and stored in advance rather than generated from movement of the planter.

In an embodiment, autonomous vehicle 810 receives the digital planting map 808 via wireless transmission, or as part of configuration data, for use in plant classification operations. The particular manner of acquiring the digital planting map 808 is not critical, and after receiving, a copy is stored in the vehicle 810 as digital planting map 830.

In an embodiment, autonomous vehicle 810 includes one or more guidance sensor devices 818, one or more digital image cameras 814, a trained classifier 822, a GPS receiver 850, and decision logic 826.

In an embodiment, guidance sensor devices 818 comprise one or more hardware sensors that are capable of sensing environmental input for use in generating guidance data. For example, short-range SONAR, RADAR or LIDAR devices may be employed to detect objects or obstacles near or around the autonomous vehicle 810. The guidance sensor devices 818 generate signals indicative of whether objects are near or around the autonomous vehicle 810, and in response, the autonomous vehicle may be programmed to capture one or more images from the digital image cameras 814 and to process the captured images using trained classifier 822 to identify a candidate agricultural product type and a confidence value. For example, autonomous mobile vehicle 810 may determine an agricultural product type of a corresponding agricultural product by sensing growth characteristic data representing plant growth characteristics of an agricultural product that is near the vehicle.

In an embodiment, field space geolocation data is determined based on signals from GPS satellite 802 and GPS receiver 850 and identifies a current location of the vehicle 810 at or within a space or region of a field. In an embodiment, at a given time, vehicle 820 is located at a field that is planted with seeds or hybrids of a common plant type. A field to be inspected and analyzed may be divided into more than one region, each region with plants of a specific plant feature. In an embodiment, plant type may be a plant feature by which regions or spaces of a field are divided. Examples of plant types at a gross level are corn (maize) or soybeans.

Based on the data collected using the devices discussed above, the autonomous mobile vehicle is programmed to computationally project, in three-dimensional space, the precision within a field where a particular plant type should be located within a frame of vision. Furthermore, the autonomous mobile vehicle is programmed to determine an expected location of a particular crop as well as an unexpected location of a particular crop. If a plant is detected at an expected GPS location, in response, the autonomous mobile vehicle is programmed to determine that the detected plant is most likely part of the crop. If a plant is detected at an unexpected GPS location, the autonomous mobile vehicle is programmed to determine that the detected plant is potentially a weed or other unexpected item. Accordingly, plant recognition is performed faster and more efficiently because the availability of field GPS data and a field map enables rapidly identifying regions in which plants are expected, so weed recognition can be skipped for those areas.

In an embodiment, digital image camera 814 comprises one or more digital image cameras with low-resolution capability and one or more digital image cameras with high-resolution capability. Or, camera 814 may comprise a single digital camera that is capable of capturing images at high resolution or low resolution in response to signals or instructions from a stored control program. Digital image camera 814 captures digital images of objects, resulting in creating and storing captured field digital image data of objects, as they are positioned for viewing as vehicle 810 travels the field. In an embodiment, vehicle 810 is programmed to retrieve GPS data for the then-current geo-location of the vehicle at the time that camera 814 captures images and is programmed to generate GPS encoded digital images 816 of specific spaces of a field. In an embodiment, digital image camera 814 captures low-resolution or a combination of low and high-resolution digital images of a plant object 812.

In an embodiment, digital image camera 814 may be mounted to, integrated with coupled to, or connected to the outside body of autonomous mobile vehicle 810. In an embodiment, multiple different cameras may be located at various external parts of the vehicle 810 for more precise GPS encoded image data. For example, cameras can capture images at several different angles and combined using programming to adjust for biases and inaccuracies of any particular single camera. Angles of view can include front, side and overhead views of a field.

Guidance sensor devices 818 are programmed to sense locations of objects in the travel path of vehicle 810. Data for sensed objects is transmitted to control logic 820. In an embodiment, sensor devices 818 comprise one or more sensors, each generating field geolocation data representing the then-current geo-location of vehicle 810 as the vehicle traverses the field. In an embodiment, sensor devices 818 may be mounted to, integrated with coupled to, or connected to the outside body of autonomous mobile vehicle 810. In an embodiment, sensor devices 818 may be located at various external parts of the vehicle 810 for accurate sensing. For example, several sensors spread across an external front part of vehicle 810 may be capable of receiving sensing signals from different angles when encountering a plant or other object. Data from various angles may assist with providing higher quality data for sensed objects.

Control logic 820 is programmed to receive sensed location data 810 and to receive digital images from camera 814 to generate GPS encoded digital images 816, which are coupled to the trained plant classifier 822. The trained plant classifier 822 comprises artificial intelligence/machine learning instructions programmed to classify digital images based upon prior training against a training set of images representing plants and weeds. In an embodiment, plant classifier 822 is programmed to use a first mode of coarse image classification in most cases after plant objects are encountered, and a second mode of slower, high-accuracy plant recognition only under specified circumstances because it is computationally intense. Trained plant classifier 822 receives digital space field specific images 816, applies a training model to the digital images, to generate classification output 824, represented by product type data. The classifier 822 applies a training model to detect differences between real-time product type data obtained from the field and expected product type data based on the stored plant map 830.

In an embodiment, the classifier 822 generates classification output 824 specifying the digital image data as a product type, in combination with a confidence value. An example of product type is corn, soybeans or a particular weed. In an embodiment, the confidence level value is output to represent a level of confidence that the product type is correct.

In one embodiment, the autonomous mobile vehicle 810 is programmed to transmit the classification output 824 to a host computer that is remotely located, using wireless networking via network 840, for remote analysis. Additionally or alternatively, the autonomous mobile vehicle 810 is programmed to transmit the classification output 824 to decision logic 826, which is programmed to execute the conditions and actions shown in block 832. In an embodiment, decision logic 826 receives field space specific product type data 828, digital planting map 830 and classification output 824 as input for executing programmed logic to test the conditions shown in block 832. In some embodiments, decision logic 826 may be programmed to modify digital planting map 830 by translating geo-location values represented in the map data to account for inaccuracy of a planter that originally generated the planting map data. For example, a planter that generated digital planting map 830 may not be as accurate as the autonomous mobile vehicle 810 so the vehicle may be programmed to execute data correction operations. Furthermore, the vehicle 810 may be programmed to overlay the digital planting map 830 with other data to project images into 3D space using augmented reality techniques.

In an embodiment, block 832 comprises instructions to test whether the input indicates a plant type match and a plant location match so that a plant is in an expected location; if so, then a 'disease analysis' signal is output. In an embodiment, block 832 comprises instructions to test whether the input indicates a plant type match and fails to determine a plant location match so that a plant is in an unexpected location; if so, then a 'weed analysis' signal is output. In an embodiment, block 832 comprises instructions to test whether the input indicates no plant type match and a plant location match; if so, then a 'skip classification' signal is output. Last, in an embodiment, block 832 comprises instructions to test whether the input indicates no plant type match and no plant location match; if so, then a 'no classification' signal is output and/or an alert or notification is generated.

In an embodiment, decision logic 826 may use the confidence level value received with classification output 824 to inform decision-making in the logic of block 832. For example, a high confidence level value over a stored or programmed threshold value may result in a positive output for one or more of the tests in block 832 and a low confidence level value may result in those tests having negative output.

In an embodiment, autonomous mobile vehicle 810 is programmed, based on the signals determined via the logic of block 832, to transmit the captured digital image data, wirelessly or by physical connection, to another host computer via network 840. In this approach, the host computer may be programmed to execute disease analysis or weed analysis on digital images that have been recognized and to provide results to a grower's computer or provide output in other ways. Additionally or alternatively, the signals determined via the logic of block 832 may cause autonomous mobile vehicle 810 to execute disease analysis or weed analysis internally using other programmed logic.

In an embodiment, autonomous vehicle 810 causes displaying the notification, outcome, or a combination thereof that is produced by decision logic 826 and block 832 on a graphical user interface of a user computer that is separate from the autonomous mobile equipment. In an example, decision logic 826 causes displaying notification and outcome information on a graphical user interface of field manager computer device 104 or a cab computer.

3.4 Automated Field Plant Type Classification

Figure 9:
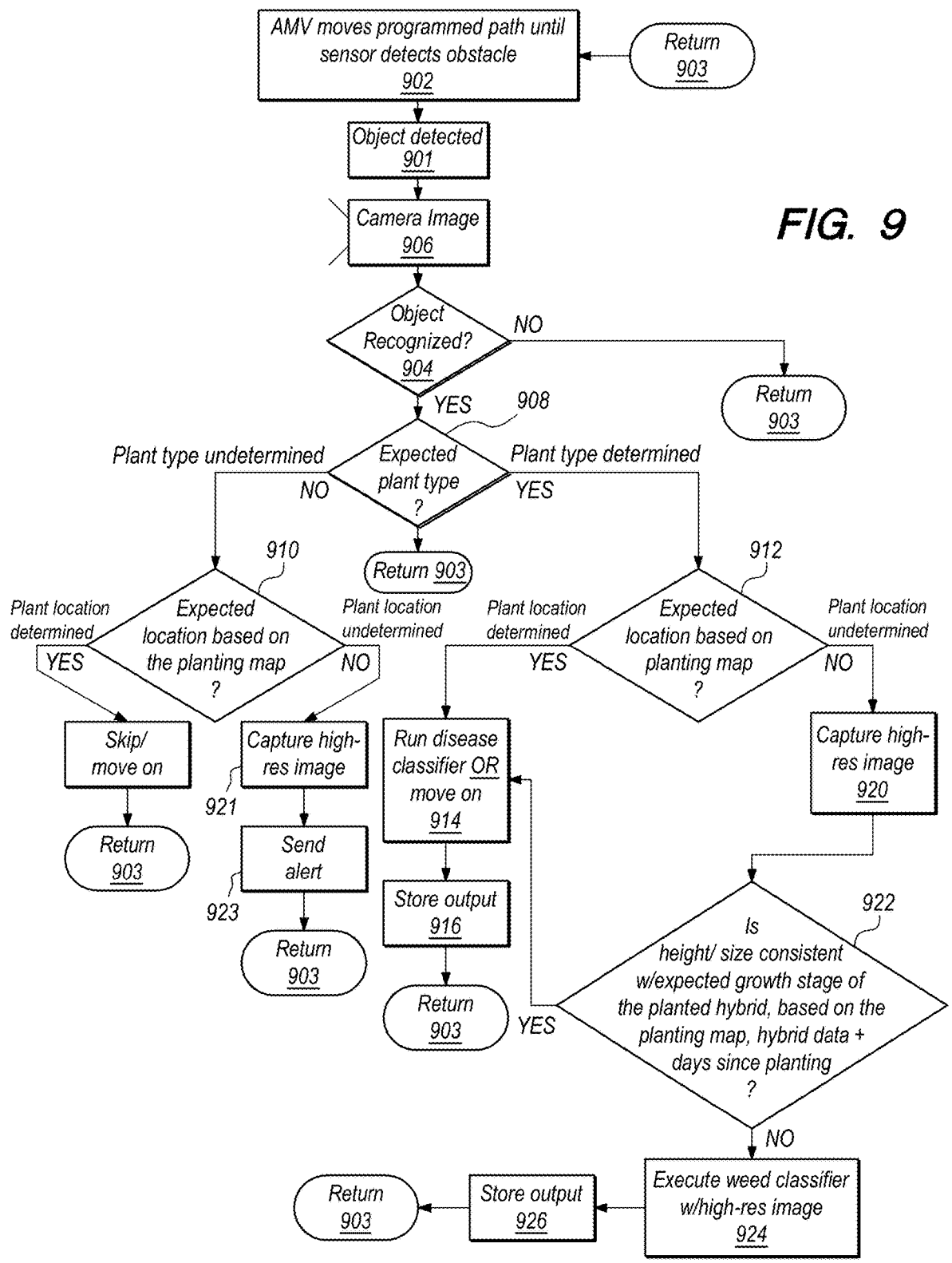
FIG. 9 shows an example flow process for determining field plant type classification.

FIG. 9 shows an example process for determining field plant type classification. For purposes of describing a clear example of one embodiment, the process is described in connection with FIG. 8, but other embodiments may be executed in other environments. In an embodiment, an automated field plant type classification process 900 is performed by autonomous mobile vehicle 810 of FIG. 8; for example, the process 900 may be programmed as part of control logic 820, decision logic 826 or a combination.

At step 902, the autonomous mobile vehicle 810 traverses a field typically on a programmed path in or through a planted field. The vehicle 810 traverses until one or more sensors indicate that the vehicle has encountered an object. Sensors and programmed code executing in vehicle 810 may discriminate coarsely among objects based on size, density or other characteristics.

At step 901, an object is detected, such as object 812, is detected. At step 904, a low-resolution digital image of the object is captured. At step 906, the process is programmed to test whether the object in the digital image is recognized, for example whether the object appears to be a plant as opposed to an obstacle, barrier or other non-plant object. Thus, steps 901, 904, 906 collectively involve coarse-level, fast image processing in a first image capture mode based for example on low-resolution digital images. These steps typically require less processing resources, memory and storage than more intensive, accurate classification operations, but are useful to make fast recognition decisions. For example, product type detection can comprise logic programmed to determine whether an object is a seed or hybrid, weed or no weed, classification or no classification, diseased or not, executing these decisions at a coarse level.

If such an object is not recognized, then control returns to step 902. If an object is recognized, then control transfers to block 908. At or before step 908, the autonomous mobile vehicle may reduce its travel speed or stop. Optionally, at or before step 908, the vehicle may be programmed to capture a high-resolution digital image of the object, for example using camera 814 of FIG. 8.

In an embodiment, undetectable parts of digital images may be eliminated from processing for optimization. For example, high-resolution digital image of a scene that is captured by the autonomous mobile vehicle at step 908 may have limited clarity with only 60% active digital image pixels. For faster travel through the field, the vehicle may be programmed to quickly eliminate 40% of the image pixels that contribute to undetectable image parts from processing.

At step 908, the autonomous vehicle attempts to determine a plant type classification of the detected object using programmed logic for the product type match determination process previously discussed with reference to FIG. 8. If classification in step 908 results in determining a plant type, then control transfers to block 912. If classification in step 908 does not result in determining a plant type, then control transfers to block 910.

At step 912, positive plant location determination causes the autonomous mobile vehicle to skip or proceed on to step 903. A negative plant location determination causes control to transfer to step 921. At step 921, the mobile vehicle may automatically switch to a second image capture mode to capture high-resolution digital images of the object under investigation by utilizing its high-resolution camera for in-depth analysis. At step 923, the autonomous mobile vehicle may transmit an alert or 'no classification' notification and the process resumes at step 903. In an embodiment, the autonomous mobile vehicle may transmit the captured high-resolution digital images to a remotely located host or server for further recognition analysis. Thus, step 921 represents switching to capture a high-resolution image when an expected plant type is not recognized or determined and is not in a location at which planting is expected.

A positive plant location match at 912 causes transferring control to step 914 and the mobile vehicle either initiates or performs 'disease analysis' or continues to step 903 without initiating disease analysis or performing disease analysis. If a disease recommendation or action is taken, the autonomous vehicle may transmit a 'disease analysis' notification and if proceeding to step 903 instead, the autonomous vehicle may send no notification.

In an embodiment, a negative plant location determination at step 912 causes process 900 to switch automatically to a second image capture mode for further plant recognition analysis starting at step 920, for example by capturing high resolution plant images followed by plant feature type determination at step 922 using high resolution images of step 920.

In an embodiment, plant features other than or in addition to plant type may be evaluated and recognized. Plant product characteristics of a plant product under inspection and analysis may vary. For example, plant product characteristics may be plant size, plant height, plant growth stage, planting duration, a combination. In an embodiment, non-plant related features may be tested at step 922. For example, planted plant or seed type based on the planting map, plant growth patterns, field weather after planting can assist in predicting crop growth stage and predict the expected foliar structure in addition to height of more desirable plants. Macro plant recognition processes that are based on the foregoing plant features, for example, enjoy very rapid plant image scanning and plant feature recognition with the caveat that shorter or much taller than expected plants may require further scrutiny, for example high resolution image scans.

In an example, referring to FIG. 9, the autonomous mobile vehicle may determine a plant size match between expected plant size and measured plant size using the captured high-resolution images of step 920. At step 922, positive plant size match determination, for example, takes process 900 to step 914 and the process continues from there. Negative plant size match determination takes process 900 to step 924. At step 924, based on high-resolution image capture, the object is determined to possibly be weed or another type of unplanted crop plant. The autonomous vehicle may either initiate, perform, or transmit notification of 'weed analysis'. Weed analysis may further include weed type classification, for example.

After step 926, process 900 may store the outcome of step 924 weed analysis and return to continue from step 903.

4. Other Aspects of Disclosure

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

Embodiments have been described to provide real time at-field in-season mobile plant feature recognition utilizing efficient plant type classification processes by leveraging rapid travel through a field and a combination of coarse recognition processes while scanning objects for plant feature type recognition and more detailed object recognition in some cases. Field plant type classification processes utilize cost effective coarse recognition techniques for rapid product recognition and switch to precise and deeper recognition techniques to utilize high quality image capture and sensing tools for improving plant classification analysis. Further, plant inspection is implemented with environmentally friendly measures by use of autonomous vehicles or robots.

Embodiments can relate to weed eradication, spraying fungicides or pest remediation. Embodiments may use augmented reality visualization techniques to supplement digital images of field crops with data layers that have not been previously available. Classification of images can be supplemented with data based on stored planting coordinates and values specifying expected growth stage. The classification processes described herein can be adapted to vehicles with different capabilities in speed or processing power.

In some embodiments, image recognition and classification may generate output for evaluating plant growth stages, plant health, fungal infection, and the presence of diseases or pests. Other embodiments may use processing focused on weed eradication, physically disrupting weeds using electromechanical actuators or chemically treating fields.

Embodiments optimize image capture and analysis approaches and are substantially faster and less costly than prior approaches.

Embodiments may provide the autonomous mobile vehicle 810 with a continuous or real-time wireless networking connection to cloud computing resources, enabling the vehicle to retrieve cloud-based data in real time, or to transmit data to remotely located host computers for other processing. The wireless connection may be used to retrieve different data layers in real-time as the vehicle traverses the field, to support generating 3D maps or simulations of field images. For example, satellite imagery retrieved at the time that field traversal starts may indicate that ponding water is near a then-current location of the vehicle, and in response, the vehicle may be programmed to avoid the ponding water by executing real-time changes in its regular navigation path.

What is claimed is:

1. A method for determining a specific agricultural product type using autonomous mobile equipment comprising:
   obtaining digital image data from a digital camera on autonomous mobile equipment configured to traverse an agricultural field, the digital image data representing images of one or more plants in the agricultural field and one or more images of a specific plant to be classified, wherein the specific plant is associated with a specific agricultural product type to be determined and planted at one or more field geolocations of the agricultural field;
   receiving specific field space geolocation data representing a specific field space geolocation of the autonomous mobile equipment in the agricultural field;
   comparing the specific agricultural product type to one or more pre-classified product types;
   comparing the specific field space geolocation to one or more pre-classified plant geolocations;
   if the specific agricultural product type matches a pre-classified product type of the one or more pre-classified product types and the specific field space geolocation matches a pre-classified plant geolocation of the one or more pre-classified plant geolocations, determining a disease analysis of the specific agricultural product type.

2. The method of claim 1, wherein if the specific agricultural product type does not match a pre-classified product type of the one or more pre-classified product types and the specific field space geolocation does not match a pre-classified plant geolocation of the one or more pre-classified plant geolocations, automatically capturing a high-resolution digital image of the one or more plants.

3. The method of claim 1, wherein if the specific agricultural product type matches a pre-classified product type of the one or more pre-classified product types and the specific field space geolocation does not match a pre-classified plant geolocation of the one or more pre-classified plant geolocations, automatically capturing a high-resolution digital image of the one or more plants.

4. The method of claim 1, wherein a set of pre-classified product type data of a corresponding set of pre-classified agricultural products represents the pre-classified product types and a pre-classified agricultural product having a corresponding pre-classified agricultural product geolocation in the agricultural field where a corresponding pre-classified agricultural product grows well.

5. The method of claim 1, further comprising determining a plant location match between the specific field space geolocation and one or more pre-classified agricultural products geolocations based on a digitally stored plot map of the agricultural field, the plot map including a geolocation of the specific agricultural product.

6. The method of claim 1, further comprising, if the specific agricultural product type does match a pre-classified product type of the one or more pre-classified product types and the specific field space geolocation does not match a pre-classified plant geolocation of the one or more pre-classified plant geolocations, determining a weed analysis of the specific agricultural product type.

7. The method of claim 6, wherein the weed analysis comprises executing a trained machine learning classifier to generate a classification output specifying the digital image data as a particular weed.

8. The method of claim 1, further comprising, if the specific agricultural product type does match a pre-classified product type of the one or more pre-classified product types and the specific field space geolocation does match a pre-classified plant geolocation of the one or more pre-classified plant geolocations, determining a disease analysis of the specific agricultural product type.

9. The method of claim 8, wherein the disease analysis comprises executing a trained machine learning classifier to generate a classification output specifying the digital image data as a diseased plant candidate.

10. The method of claim 1, wherein comparing the specific agricultural product type to one or more pre-classified product types is based on a plant growth characteristic of the specific agricultural product type and a pre-classified plant growth characteristic corresponding to the pre-classified product type to which the specific agricultural product type matches.

11. The method of claim 10, wherein the plant growth characteristic of the specific agricultural product type is obtained from one or more sensor devices, each of the one or more sensor devices being located at a location in or near the agricultural field.

12. The method of claim 1, wherein comparing the specific agricultural product type to one or more pre-classified product types is based on digitally-stored field climate data specifying a historic or current field climate of the agricultural field.

13. The method of claim 1, further comprising, if the specific agricultural product type does match a pre-classified product type of the one or more pre-classified product types and the specific field space geolocation does not match a pre-classified plant geolocation of the one or more pre-classified plant geolocations, automatically capturing the high-resolution digital image of the one or more plants, determining whether one or more attributes of the one or more plants in the high-resolution digital image are consistent with expected growth, and executing a weed classifier using the high-resolution digital image.

14. A non-transitory computer readable storage medium storing one or more programs for determining a specific agricultural product type using autonomous mobile equipment, the one or more programs comprising instructions which, when executed by an electronic device with a display and a user input interface, cause the device to:
obtain digital image data from a digital camera on autonomous mobile equipment configured to traverse an agricultural field, the digital image data representing images of one or more plants in the agricultural field and one or more images of a specific plant to be classified, wherein the specific plant is associated with a specific agricultural product type to be determined and planted at one or more field geolocations of the agricultural field;
receive specific field space geolocation data representing a specific field space geolocation of the autonomous mobile equipment in the agricultural field;
compare the specific agricultural product type to one or more pre-classified product types;
compare the specific field space geolocation to one or more pre-classified plant geolocations;
if the specific agricultural product type matches a pre-classified product type of the one or more pre-classified product types and the specific field space geolocation matches a pre-classified plant geolocation of the one or more pre-classified plant geolocations, determine a disease analysis of the specific agricultural product type.

15. The non-transitory computer readable storage medium of claim 14, wherein if the specific agricultural product type does not match a pre-classified product type of the one or more pre-classified product types and the specific field space geolocation does not match a pre-classified plant geolocation of the one or more pre-classified plant geolocations, automatically capture a high-resolution digital image of the one or more plants.

16. The non-transitory computer readable storage medium of claim 14, wherein if the specific agricultural product type does match a pre-classified product type of the one or more pre-classified product types and the specific field space geolocation does not match a pre-classified plant geolocation of the one or more pre-classified plant geolocations, automatically capture a high-resolution digital image of the one or more plants.

17. The non-transitory computer readable storage medium of claim 14, further comprising determine a plant location match between the specific field space geolocation and the pre-classified agricultural products geolocations based on a digitally stored plot map of the agricultural field, the plot map including a geolocation of the specific agricultural product.

18. The non-transitory computer readable storage medium of claim 14, further comprising if the specific agricultural product type does match a pre-classified product type of the one or more pre-classified product types and the specific field space geolocation does not match a pre-classified plant geolocation of the one or more pre-classified plant geolocations, determining a weed analysis of the specific agricultural product type.

19. The non-transitory computer readable storage medium of claim 14, further comprising execute a trained machine learning classifier to generate a classification output specifying the digital image data as a particular weed.

20. The non-transitory computer readable storage medium of claim 14, further comprising if the specific agricultural product type does match a pre-classified product type of the one or more pre-classified product types and the specific field space geolocation does match a pre-classified plant geolocation of the one or more pre-classified plant geolocations, determine a disease analysis of the specific agricultural product type.

21. The non-transitory computer readable storage medium of claim 20, further comprising execute a trained machine learning classifier to generate a classification output specifying the digital image data as a diseased plant candidate.

22. The non-transitory computer readable storage medium of claim 14, wherein compare the specific agricultural product type to one or more pre-classified product types is based on a plant growth characteristic of the specific agricultural product type and a pre-classified plant growth characteristic corresponding to the pre-classified product type to which the specific agricultural product type matches.

23. The non-transitory computer readable storage medium of claim 22, wherein the plant growth characteristic of the specific agricultural product type is obtained from one or more sensor devices, each of the one or more sensor devices being located at a location in or near the agricultural field.

24. The non-transitory computer readable storage medium of claim 14, wherein compare the specific agricultural product type to one or more pre-classified product types is based on digitally-stored field climate data specifying a historic or current field climate of the agricultural field.

25. An autonomous mobile device comprising:
a digital camera;
one or more hardware processors coupled to the digital camera; and
one or more non-transitory computer-readable storage media coupled to the one or more hardware processors and storing machine-executable instructions which, when executed using the one or more hardware processors, cause the one or more hardware processors to:
obtain digital image data from the digital camera on autonomous mobile equipment configured to traverse an agricultural field, the digital image data representing images of one or more plants in the agricultural field and one or more images of a specific plant to be classified, wherein the specific plant is associated with a specific agricultural product type to be determined and planted at one or more field geolocations of the agricultural field;
receive specific field space geolocation data representing a specific field space geolocation of the autonomous mobile equipment in the agricultural field;
compare the specific agricultural product type to one or more pre-classified product types;
compare the specific field space geolocation to one or more pre-classified plant geolocations;
if the specific agricultural product type does match a pre-classified product type of the one or more pre-classified product types and the specific field space geolocation does match a pre-classified plant geolocation of the one or more pre-classified plant geolocations, determine a disease analysis of the specific agricultural product type.

\* \* \* \* \*